US010283085B2

(12) United States Patent
Imai

(10) Patent No.: US 10,283,085 B2
(45) Date of Patent: May 7, 2019

(54) DISPLAY DEVICE AND DISPLAY METHOD

(71) Applicant: Japan Display Inc., Minato-ku (JP)

(72) Inventor: Takayuki Imai, Tokyo (JP)

(73) Assignee: Japan Display Inc., Minato-ku (JP)

( * ) Notice: Subject to any disclaimer, the term of this patent is extended or adjusted under 35 U.S.C. 154(b) by 36 days.

(21) Appl. No.: 15/611,167

(22) Filed: Jun. 1, 2017

(65) Prior Publication Data

US 2017/0352329 A1 Dec. 7, 2017

(30) Foreign Application Priority Data

Jun. 1, 2016 (JP) ................................ 2016-109970

(51) Int. Cl.
*G06F 3/038* (2013.01)
*G09G 5/10* (2006.01)
*G09G 3/36* (2006.01)
*G09G 5/02* (2006.01)

(52) U.S. Cl.
CPC ................ *G09G 5/10* (2013.01); *G09G 3/36* (2013.01); *G09G 5/028* (2013.01); *G09G 2310/0235* (2013.01); *G09G 2320/0626* (2013.01); *G09G 2320/0646* (2013.01); *G09G 2320/0666* (2013.01); *G09G 2340/0428* (2013.01); *G09G 2360/144* (2013.01)

(58) Field of Classification Search
CPC ............ G09G 5/10; G09G 5/028; G09G 3/36; G09G 2360/144; G09G 2340/0428; G09G 2320/0626; G09G 2320/0646; G09G 2320/0666; G09G 2310/0235
See application file for complete search history.

(56) References Cited

U.S. PATENT DOCUMENTS 6,453,069 B1 9/2002 Matsugu et al.
2002/0164074 A1 11/2002 Matsugu et al.
2011/0096261 A1* 4/2011 Kobayashi ............ G02F 1/1334 349/42
2012/0098875 A1* 4/2012 Shinkai ................ G02B 6/0036 345/690
2014/0063039 A1* 3/2014 Drzaic ..................... G09G 5/02 345/589
2015/0091792 A1* 4/2015 Koo ......................... G09G 5/10 345/156

(Continued)

FOREIGN PATENT DOCUMENTS

JP 8-323299 12/1996
JP 10-149449 6/1998

*Primary Examiner* — Nelson M Rosario
*Assistant Examiner* — Andrew Lee
(74) *Attorney, Agent, or Firm* — Oblon, McClelland, Maier & Neustadt, L.L.P.

(57) ABSTRACT

According to one embodiment, a display device includes a plurality of light sources, a display panel illuminated by the light sources and a drive circuit which drives the light sources time-divisionally to emit light sequentially based on a first image signal for displaying an image in color. The drive circuit determines whether visibility of the image displayed in color deteriorates because of external light, extracts from the first image signal a brightness signal when determining that the visibility of the image deteriorates, generates a second image signal based on the brightness signal, and drives the display panel based on the second image signal when the second image signal is generated.

19 Claims, 8 Drawing Sheets

(56) References Cited

U.S. PATENT DOCUMENTS

| | | | | |
|---|---|---|---|---|
| 2015/0109547 | A1* | 4/2015 | Kim | G02F 1/133305 349/12 |
| 2017/0039919 | A1* | 2/2017 | Wu | G09G 3/2003 |

* cited by examiner

DISPLAY DEVICE AND DISPLAY METHOD

CROSS-REFERENCE TO RELATED APPLICATIONS

This application is based upon and claims the benefit of priority from Japanese Patent Application No. 2016-109970, filed Jun. 1, 2016, the entire contents of which are incorporated herein by reference.

FIELD

Embodiments described herein relate generally to a display device and a display method.

BACKGROUND

A liquid crystal display device which displays an image in color generally has color filters. But at the same time, the color filters may hinder the improvement in transmittance.

Hence, it has been proposed to use a drive system which is widely known to achieve a color presentation by making each pixel time-divisionally change lighting of its light sources (LED's) among red, green and blue (hereinafter referred to as a field sequential drive system). The field sequential drive system does not require any color filters. Therefore, it is expected that the field sequential drive system will improve a liquid crystal display device in transmittance.

Let us assume here a case where a liquid crystal display device which achieves a color presentation with the above-mentioned field sequential drive system is used in an environment where external light (sunlight etc.) is directly irradiated as the outdoors in the daytime, for example. In this case, external light exceeds any light source in brightness. An image displayed on the liquid crystal display device will greatly deteriorate in visibility.

DETAILED DESCRIPTION

An embodiment will be described hereinafter with reference to the accompanying drawings.

In general, according to one embodiment, a display device includes a plurality of light sources emitting of light of different colors, a display panel illuminated by the light sources, and a drive circuit configured to drive the light sources time-divisionally to emit light sequentially based on a first image signal for displaying an image in color on the display panel. The drive circuit is configured to determine whether visibility of the image displayed in color deteriorates because of external light, extract from the first image signal a brightness signal indicative of brightness of the image when determining that the visibility of the image deteriorates, generate a second image signal based on the brightness signal, and drive the display panel based on the second image signal when the second image signal is generated.

Figure 1:
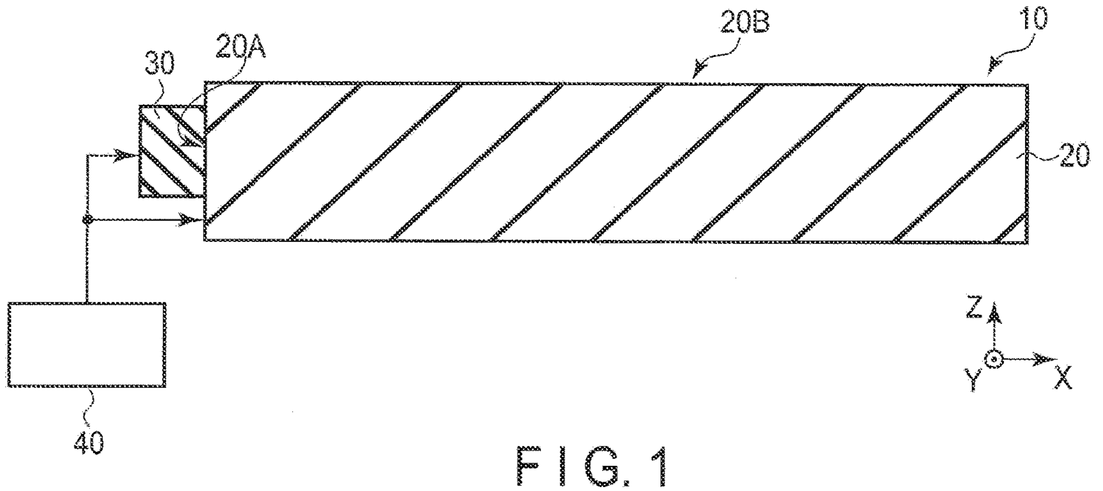
FIG. 1 is a diagram schematically illustrating an exemplary structure of a display device in an embodiment.

FIG. 1 is a diagram schematically illustrating an exemplary structure of a display device of the present embodiment. A display device 10 illustrated in FIG. 1 includes a display panel 20, a light source 30, and a drive circuit 40 which drives the display panel 20 and the light source 30.

The display device 10 in the present embodiment, is for example, a liquid crystal display device (a transparent display device) which has high transmittance and employs polymer dispersed liquid crystals (PDLC's), for example. The display device 10 includes a light-modulating layer (a polymer dispersed liquid crystal layer), and displays images using light emitted from the light-modulating layer, which will be described later in detail.

The display panel 20 includes a side which receives light from the light source 30 (namely, a surface illuminated by the light source 30). The side is thus called a light-incident surface 20A. The display panel 20 includes a top surface which emits light when the display panel 20 displays an image. The top surface is therefore called a light-emitting surface 20B.

Figure 2:
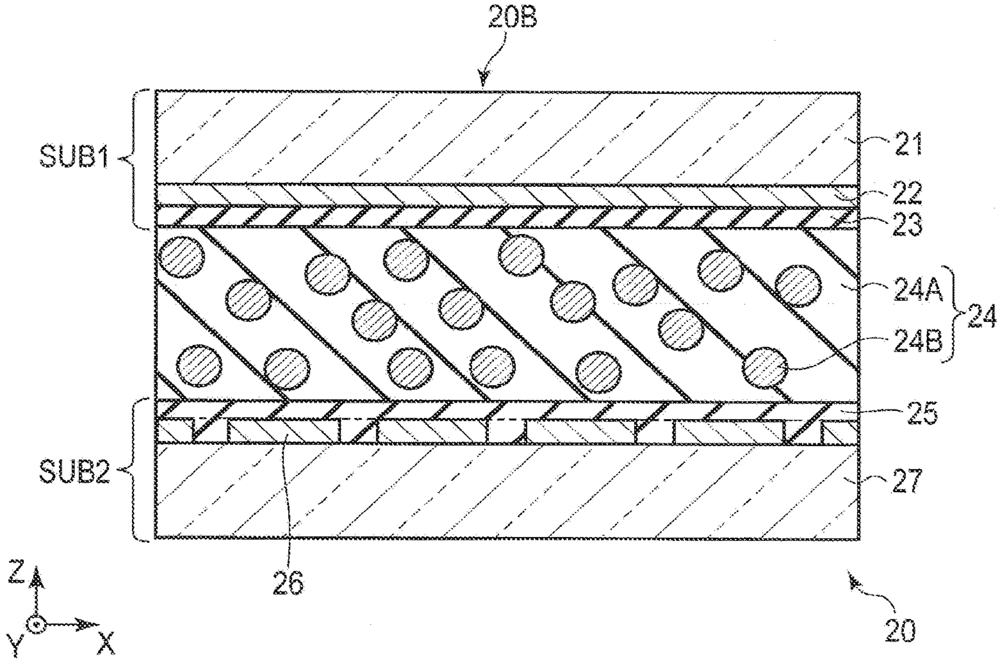
FIG. 2 is a diagram illustrating an exemplary cross-section of a display panel.

FIG. 2 is a diagram illustrating an exemplary cross-section of the display panel 20. As illustrated in FIG. 2, the display panel 20 includes a first substrate SUB1, a second substrate SUB2, and a light-modulating layer 24 held between the first substrate SUB1 and the second substrate SUB2. The first substrate SUB1 includes a transparent board 21, a first electrode 22, and an alignment film 23 in the mentioned order in a direction toward the light-modulating layer 24. The second substrate SUB2 includes an alignment film 25, a second electrode 26, and a transparent board 27 in the mentioned order in a direction away from the light-modulating layer 24. The second substrate SUB2 includes scanning lines, signal lines perpendicularly crossing the scanning lines, and switching elements arranged at respective crossing points where the scanning lines cross the signal lines. The second substrate SUB2 also includes an insulating film insulating to obtain isolation between the lines. The first substrate SUB1 and the second substrate SUB2 do not include any color filters.

The transparent board 21 and the transparent board 27 make a pair, and the transparent board 21 includes the light-emitting surface 20B on a side opposite to the surface on which the first electrode 22 is provided. On the other hand, the transparent board 27 is disposed to interpose the light-modulating layer 24 and the like between the transparent board 21 and itself. The transparent boards 21 and 27 support the light-modulating layer 24, and generally, are each formed from a transparent board to visible light, for example, a glass board or a plastic film.

The first electrode 22 and the second electrode 26 make a pair, and the first electrode 22 is arranged on a surface of the transparent board 21, which is on a side of the light-modulating layer 24. The first electrode 22 is, for example, a single sheet electrode which extends over the whole of that surface of the transparent board 21. The second electrode 26 is formed in an island-manner on a surface of the transparent board 27, which is on a side of the light-modulating layer 24. On the display panel 20, there are island-like second electrodes 26 are arranged in a matrix along the direction X and the direction Y. Each of the second electrodes 26 is connected to a corresponding one of switching elements, which are not explained in full detail, and separately driven by the drive circuit 40. The first electrode 22 and the second electrode 26 are made of transparent conductive materials, such as indium tin oxide (ITO) or indium zinc oxide (IZO), for example. It is preferable that the transparent conductive material hardly absorbs visible light. How to arrange the first electrode and the second electrode will be described later in detail.

The alignment film 23 and the alignment film 25 are located between the first electrode 22 and the light-modulating layer 24 and between the second electrode 26 and the light-modulating layer 24, respectively, to align liquid crystals or monomers which are used for, for example, the light-modulating layer 24. Examples of the type of the alignment films are perpendicular alignment films and horizontal alignment films. In the exemplary structure illustrated in FIG. 2, horizontal alignment films are used as the alignment films 23 and 25. An alignment film formed by applying alignment treatment to a resin film such as a polyimide or polyamide imide film may be used as a horizontal alignment film. The alignment treatment includes rubbing treatment, optical alignment treatment, etc., for example. Instead, if plastic films are used as the transparent boards 21 and 27, it is preferable from a viewpoint of suppressing deformation of the transparent boards 21 and 26 that alignment films 23 and 25 should be applied to the respective surfaces of the transparent boards 21 and 27 and then the transparent boards 21 and 27 should be fired at a temperature as low as possible. Therefore, it is preferable that polyamide imide which is formable at a temperature of 100° C. or less be used for the alignment films 23 and 25.

It should be noted that the alignment films 23 and 25 should only have a function of aligning liquid crystals or monomers. It is also possible that application of an electric field or a magnetic field between the first electrode 22 and the second electrode 26 may align liquid crystals or monomers in the light-modulating layer 24. Therefore, when an electric field or a magnetic field is generated between the first electrode 22 and the second electrode 26, it is not necessary to use the alignment films 23 and 25. It is possible to make liquid crystals or monomers to be fixed in their aligned state as long as voltage is applied if the monomers are polymerized by irradiating ultraviolet rays to the monomers while applying an electric field or a magnetic field between the first electrode 22 and the second electrode 26. When voltage is used for aligning liquid crystals or monomers, it is possible to separately use electrodes for alignment and drive or, alternatively, to use for a liquid crystal material two-frequency liquid crystals, which reverses the sign of dielectric constant anisotropy with frequency. When a magnetic field is used for aligning liquid crystals or monomers, it is preferable to use for liquid crystals or monomers such materials that have high susceptibility anisotropy. It is preferable to use, for instance, such materials that have many benzene rings.

The light-modulating layer 24 is located between the transparent boards 21 and 27 in pair. The light-modulating layer 24 exhibits scatterability or transmissivity entirely or partially to the light from the light source 20 according to the size or direction of an electric field generated between the first electrode 22 and the second electrode 26. Specifically, the light-modulating layer 24 exhibits transmissivity to the light from the light source 20 when voltage is not applied between the first electrode 22 and the second electrode 26, whereas scatterability to the light from the light source 20 when voltage is applied between the first electrode 22 and the second electrode 26. The light-modulating layer 24 is, for example, a complex layer (a polymer dispersed liquid crystal layer) which includes a bulk 24A and fine particles 24B dispersed in the bulk 24A. The bulk 24A and the fine particles 24B have optical anisotropy.

The bulk 24A is different from the particles 24B in response speed to respond to an electric field. The bulk 24A has a strip-shaped structure or a porous structure which does not respond to an electric field or the bulk 24A has a strip-shaped structure or a rod-like structure which is slower than the particles 24B in response speed. The bulk 24A may be made from polymeric materials obtained by polymerizing low molecule monomers. Specifically, the bulk 24A may be formed by aligning a material having an aligning property and a polymerizing property along an alignment direction of the alignment films 23 and 25, and then polymerizing the material (for example, monomer) with at least one of heat and light.

The particles 24B mainly include liquid crystals, and have sufficiently higher response speed than that of the bulk 24A in. Liquid crystals (liquid crystal elements) included in the particles 24B are rod-like molecules, for example. It is preferable for the particles 24B to use liquid crystal molecules having positive dielectric constant anisotropy (the so-called positive liquid crystals). When the bulk 24A has a line-shaped structure or a rod-like structure, the liquid crystal elements of the particles 24B is aligned in parallel with a longitudinal (alignment) direction of the line-shaped structure or rod-like structure of the bulk 24A.

It suffices if the monomers which form the bulk 24A and have both an alignment property and a polymerizing property are of a material having optical anisotropy and property to compound with liquid crystals. It should be noted that the monomers in the present embodiment are low molecule monomers cured by, for example, ultraviolet rays. It is preferable that liquid crystal materials and materials (polymeric materials) formed by polymerizing low molecule monomers should be in agreement with each other in optical anisotropy under the state where voltage is not applied. Therefore, it is preferable that the liquid crystal materials and the low molecule monomers should be aligned along the same direction before ultraviolet curing. If liquid crystal materials are used as the particles 24B, and if the liquid crystal materials are rod-like molecules, then it is preferable that the monomer materials to be used be also rod-like in their respective forms. As mentioned above, it is preferable to use as a monomer material a material having liquid crystallinity and a polymerization property. For example, it is preferable to have as a polymerizable functional group at least one functional group chosen from a group including an acrylate group, a methacrylate group, an acryloyloxy group, a methacryloyloxy group, a vinyl ether group, and an epoxy group. These functional groups may be polymerized by heating or applying ultraviolet rays, infrared rays, or electron rays. It is also possible to add a liquid crystalline material having multi-functional groups in order to prevent an alignment degree from being lowered when an ultraviolet ray is applied. If the bulk 24A has the above-mentioned line-shaped structure, it may be preferable to use a liquid crystallinity monomer having a bifunction as a material of the bulk 24A. It may be possible that a monomer having a single function should be added in the material of the bulk 24A to adjust a temperature to cause liquid crystallinity or, alternatively, a monomer having three or more functions should be added to improve crosslinking density.

Now, how the above-mentioned light-modulating layer 24 operates will be explained briefly with reference to FIG. 3 and FIG. 4.

Figure 3:
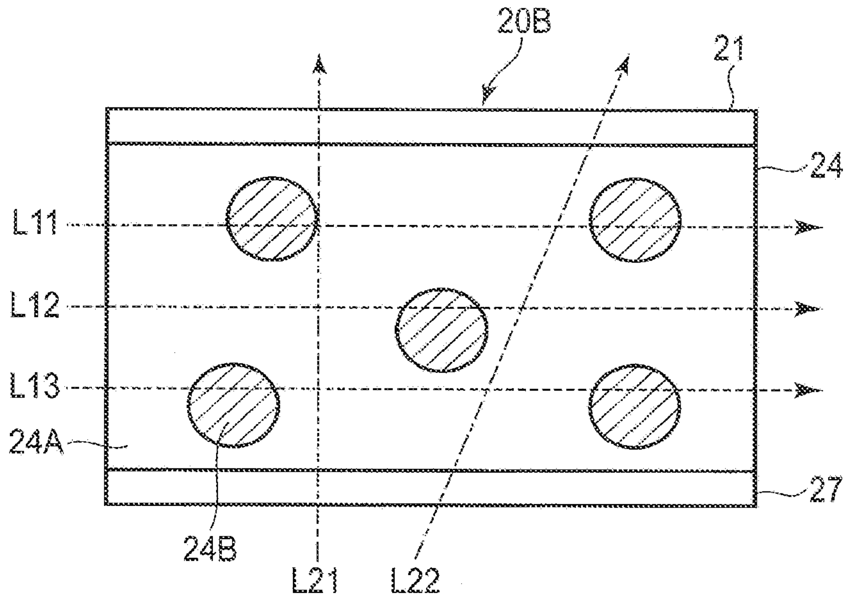
FIG. 3 is a diagram explaining functions of a light-modulating layer.

FIG. 3 schematically illustrates how the light-modulating layer 24 operates in a state where predetermined voltage is not applied to the first electrode 22 and the second electrode 26 (hereinafter referred to as a voltage-non-applied state).

In the voltage-non-applied state (i.e., a state in which no electric field is generated in the light-modulating layer 24), an optical axis of the bulk 24A (liquid crystalline monomers) and an optical axis of the particles 24B (liquid crystal molecules) coincide with each other in orientation. Therefore, the refractive-index difference is very small in all the axial directions, including a frontal direction and a diagonal direction. Therefore, lights (incident lights) L11 to L13 which are emitted from the light source 30 and enter the side of the light-modulating layer 24 pass through the light-modulating layer 24 without scattering in the light-modulating layer 24, as indicated with chain lines, for example. It should be noted that those portions of the lights from the light source 30 towards the transparent board 21 or 27 are totally reflected and thus never emitted outside. Lights L21 and L22 which externally enter the transparent board 27 and are individually illustrated with an alternate long and short dash line pass through the transparent board 27, penetrate the light-modulating layer 24 without being scattered in the light-modulating layer 24, pass through the transparent board 21, and are emitted outward from (a light-emitting surface 20B which) the transparent board 21 (has). In this way, the light-modulating layer 24 has a high transparency in a voltage-non-applied state.

Figure 4:
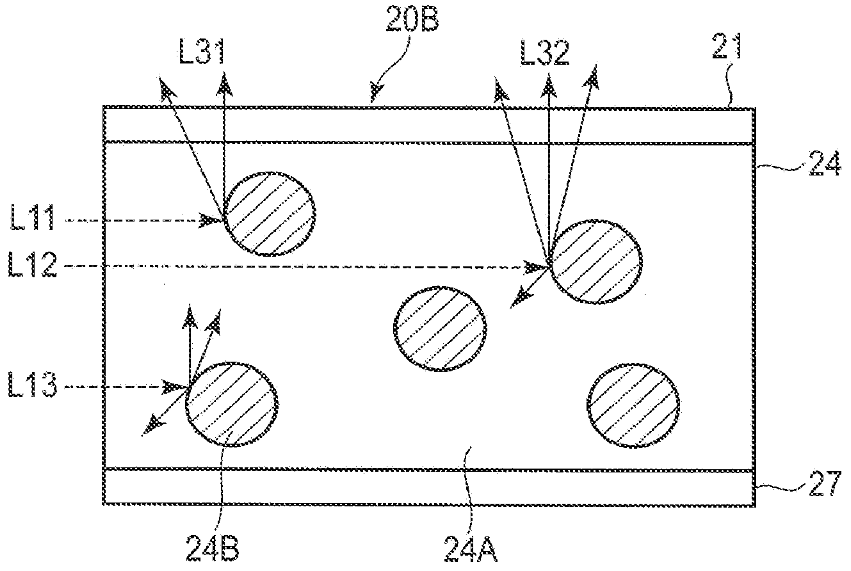
FIG. 4 is a diagram explaining functions of the light-modulating layer.

FIG. 4 schematically illustrates how the light-modulating layer 24 operates in a state where predetermined voltage is applied to the first electrode 22 and the second electrode 26 (hereinafter referred to as a voltage-applied state).

In the voltage-applied state (i.e., a state in which electric field is generated in the light-modulating layer 24), the optical axis of the bulk 24A and the optical axis of each of the particles 24B cross each other. Therefore, the refractive-index difference is very large in all the axial directions, including the front direction and the diagonal direction. Therefore, the light-modulating layer 24 exhibits a highly scattering property. In this case, the incident lights L11 to L13 from the light source 30 are scattered in the light-modulating layer 24, and the scattered lights L31 and L32 are emitted from (the light-emitting surface 20B of) the transparent board 21. This makes it possible to visually confirm the scattered lights L31 and L32 when the display panel 20 (the light-emitting surface 20B of the transparent board 21) is observed.

Accordingly, when the display panel 20 is seen from the front in a voltage-non-applied state, for example, the light having passed through the transparent board 27, the light-modulating layer 24, and the transparent board 21 is visually confirmed. On the other hand, in a voltage-applied state, the light from the light source 30, scattered in the light-modulating layer 24 and emitted toward the outside is visually confirmed.

It is described here that the light-modulating layer 24 obtains a highly scattering property in a voltage-applied state. However, the light-modulating layer 24 may be configured to obtain a highly scattering property in a voltage-non-applied state, for example, by making the optical axis of the bulk 24A and the optical axis of each of the particles 24B coincide with each other in the voltage-applied state.

Figure 5:
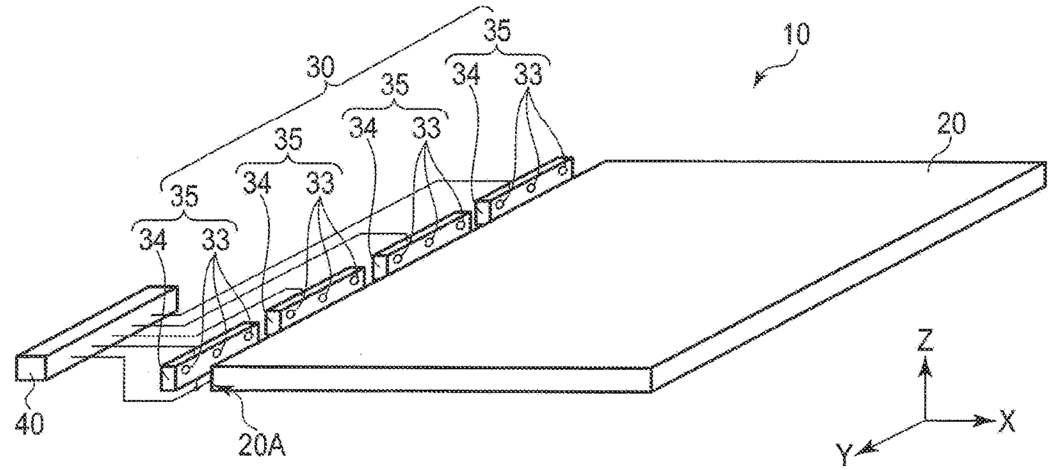
FIG. 5 is a diagram illustrating an exemplary structure of a light source.

Now, a structure of the light source 30 illustrated in FIG. 1 will be explained with reference to FIG. 5. The light source 30 is constructed by linearly arranging a plurality of point light sources 33 along the direction Y. Each of the point light sources 33 emits light toward the light-incident surface 20A, and is made of, for example, a light-emitting device which has a light emitting spot in one of its surfaces that faces the light-incident surface 20A. An LED or a laser diode (LD) may be used as a light-emitting device.

For example, a predetermined number of point light sources 33 may be placed on every one of the common boards 34. In this case, a light source block 35 includes one common board 34 and those point light sources 33 that are arranged on the common board. Each of the common boards 34 is a circuit board in which wiring lines are formed to electrically connect the point light sources 33 to the drive circuit 40, for example. All the point light sources 33 in any one of the light source blocks 35 are installed on a corresponding one of the circuit boards.

The point light sources 33 placed on each of the common boards 34 (point light sources 33 in a light source block 35) emit their respective lights which are different in color. In the example illustrated in FIG. 5, every one of the common boards 34 has three point light sources 33. The three point light sources 33 emit red light, green light and blue light, respectively. How to drive the point light sources 33 in any one of the light source blocks 35 (i.e., how the display device 10 is driven for displaying images) will be explained in detail later.

Figure 6:
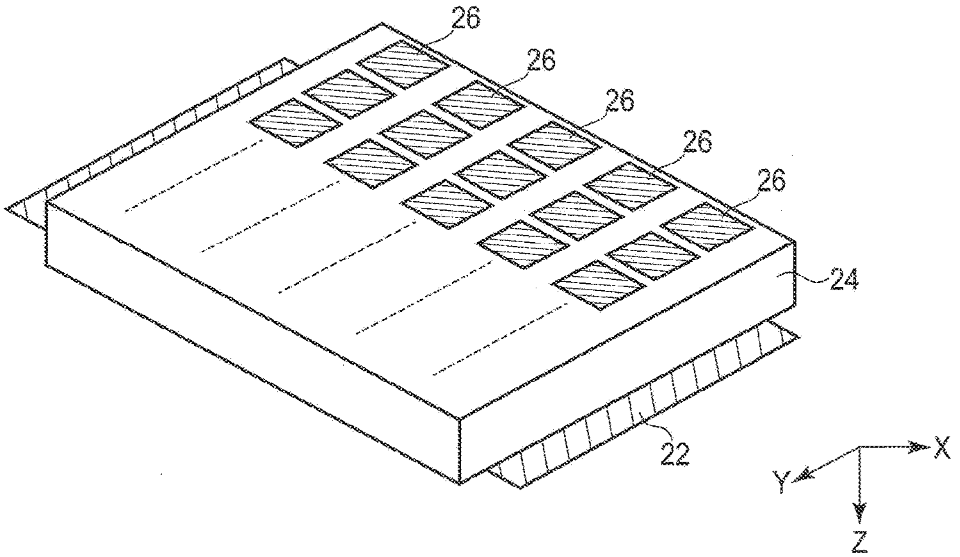
FIG. 6 is a diagram illustrating an example of arrangement of a first electrode and a second electrode.

FIG. 6 exemplarily illustrates arrangement of the first electrode 22 and the second electrode 26, both illustrated in FIG. 2. The first electrode 22 and the second electrode 26 are opposite to each other with the light-modulating layer 24 intervening between them. The first electrode 22 is a single sheet as described above. The second electrode 26 has islands arranged to form a matrix. The island-like second electrodes 26 are electrically separate from one another and are independently applied with individual voltages.

The first electrode 22 and the second electrode 26 are not restricted to any specific shape. For example, belt-like first electrodes 22 arranged at predetermined intervals and also belt-like second electrodes 26 arranged at predetermined intervals may cross each other, respectively.

Now, it will be explained below how the display device 10 in the present embodiment operates to display images (visual imagery). The display panel 20 has a display region which is divided into sub-regions called display cells (display units). The drive circuit 40 successively applies voltage to the electrodes to generate electric fields at the respective regions of the light-modulating layer 24, which correspond to the respective display cells. A display cell is equivalent to a region where, for example, the first electrode 22 and one the second electrode 26 oppose each other with the light-modulating layer 24 interposed between them.

The present embodiment is described on the assumption that a field sequential drive (system) is used as a drive system of the display device 10 for displaying an image based on an image signal.

In the field sequential drive, one frame period over which an image is displayed based on an image signal includes a first lighting period in which red point light sources 33 are on, a second lighting period in which green point light sources 33 are on, and a third lighting period in which blue point light sources 33 are on. For example, the first lighting period, the second lighting period, and the third lighting period do not coincide with one another. The group of red point light sources 33, the group of green point light sources 33, and the group of blue point light sources 33 are independently are on in one frame period.

The drive circuit 40 executes voltage control for one display cell, in which voltages according to a red image signal, a green image signal, and a blue image signal are applied to the first electrode 22 and the second electrode 26 during the first to third lighting periods.

More specifically, for example, if a red colored light emitting point light source 33 (hereinafter referred to as a red light source) in a display cell is on during the first lighting period, red light from the red light source (a red incident light) enters a region of the light-modulating layer, which corresponds to the display cell. When voltage is applied to the first electrode 22 and the second electrode 26 of a display cell, the region in the light-modulating layer 24, which corresponds to the display cell is caused to have a scattering state, and the red incident light is scattered outside. The voltage applied between the respective the electrodes assigned to a display cell and the applying time are determined according to the light intensity of the incident light and the red component of the display cell.

A case where a red light is emitted from one of the three point light sources 33 during a first lighting period has been explained. The same applies to the cases where light enters from the point light sources 33 respectively emitting green light and blue light (hereinafter respectively referred to as a green light source and a blue light source) during the second lighting period and the third lighting period.

In the field sequential drive, the following processes are repeated. All the same colored point light sources 33 assigned to the respective light source blocks 35 in the light source 30 are simultaneously are lit, and voltage is successively supplied to those pairs of electrode portions that are assigned to the respective display cells of the display region. Subsequently, the colored point light sources 33 (that is, colored lights emitted from the light source 30) of each light source block 35 are collectively switched.

With such a field sequential drive, it is possible to drive the display panel 20 to display images in color based on image signals, since the red component light, the green component light and the blue component light (point light sources 33 of different colors) can be sequentially emitted in time division under the control of the drive circuit 40, whereby lights of the respective color components can be sequentially emitted from the light-modulating layer 24.

If each of the color components of an image signal is 0, the first electrode 22 and the second electrode 26 assigned to the display cell is not driven, and thus the display cell is viewed to be in the transparent state.

It is assumed in the above explanation that the color components included in an image signal may be a red component, a green component, and a blue component. However, the color components may as well be cyan, magenta, and yellow, for example. In this case, it suffices if the green light sources 33 and the blue light sources 33 are turned on simultaneously, the red light sources 33 and the blue light sources 33 are turned on simultaneously, and the red light sources 33 and the green light sources 33 are turned on simultaneously.

Furthermore, a suitable modification (or selection) may be made to the color of light emitted from each of the point light sources 33 or the combination of colors of the respective lights emitted from the point light sources 33 when the point light sources 33 are made to simultaneously emit their respective lights.

As described above, in the present embodiment, the lights emitted from the light source 30 (the point light sources 33) and entering the light-modulating layer 24 are emitted from the light-modulating layer 24 as scattered lights, thereby achieving color presentation of images based on image signals (displayed as color images). In other words, the display device 10 of the present embodiment displays images by selectively scattering the lights emitted from the light source 30 and entering the light-modulating layer 24.

However, if the display device 10 is used in an environment where external light is irradiated (for example, the outdoors in the daytime etc.) and if the external light (sunlight) is brighter than the light (scattered light) from the light source 30, the visibility in color presentation of the display device 10 (the display panel 20) greatly degrades. Specifically, if external light brighter than the light from the light source 30 passes through the transparent board 21 of the display panel 20 and enters the light-modulating layer 24, the external light scatters as in the case of the light from the light source 30 in display cells assigned to the electrodes to which voltage is supplied, whereby the scattered external light emitted out from the light-modulating layer 24. Accordingly, not only the lights from the point light sources 33 are emitted from the light-modulating layer 24, but also external light brighter than the lights from the point light sources 33 is emitted from the light-modulating layer 24. Therefore, it is difficult to visually confirm the lights from the point light sources 33 (that is, color presentation).

Therefore, the display device 10 of the present embodiment has a function of displaying an image not in color but in monochrome when the visibility of color presentation is deteriorated because of external light. Hereafter, this function will be mainly explained.

Figure 7:
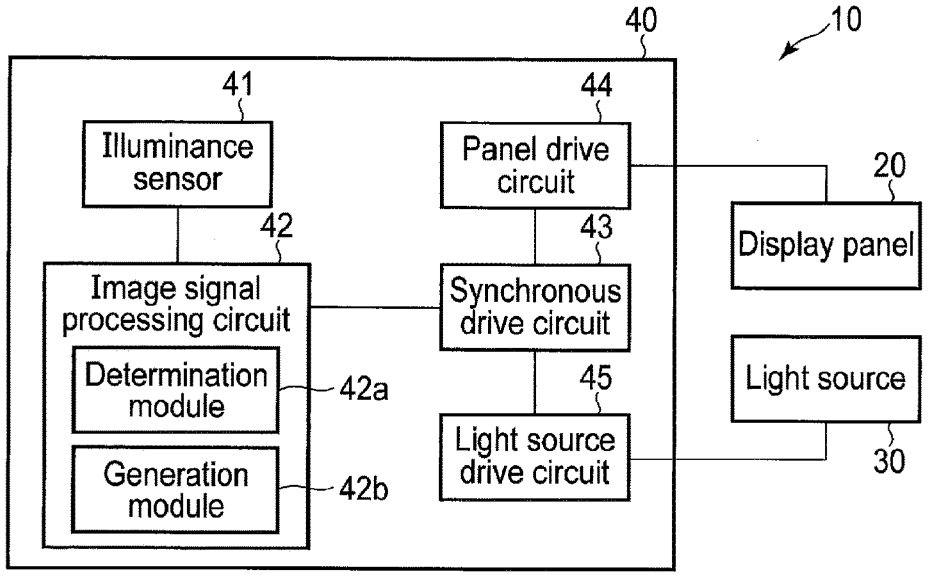
FIG. 7 is a diagram illustrating an exemplary structure of a drive circuit.

FIG. 7 mainly illustrates an exemplary structure of the drive circuit 40 illustrated in FIG. 1. The drive circuit 40 is installed on, for example, a board provided on the display panel 20, and includes an illuminance sensor 41, an image signal processing circuit 42, a synchronous drive circuit 43, a panel drive circuit 44, a light source drive circuit 45 and the like.

The illuminance sensor 41 has a function of measuring an illuminance by the external light around the display device 10, and is used to determine whether the viewability to the color presentation of the display device 10 is deteriorated because of the external light. It should be noted that the illuminance measured by the illuminance sensor 41 includes a physical quantity indicating brightness.

The image signal processing circuit 42 acquires an image signal (a first image signal) inputted into the display device 10. The image signal includes color information assigned thereto, which corresponds to the display area of the display panel 20, for example. An image signal includes for every display cell a red component signal value, a green component signal value, and a blue component signal value. Accordingly, the image signal acquired by the image signal processing circuit 42 is a signal for displaying an image in color. Hereafter, the image signal acquired by the image signal processing circuit 42 is called a color image signal for convenience.

The image signal processing circuit 42 includes a determination module 42*a* and a generation module 42*b*. The determination module 42*a* is a functional part for determining whether the visibility of color presentation in the display device 10 is deteriorated based on the illuminance measured by the illuminance sensor 41. The generation module 42*b* is a functional part for generating an image signal (a second image signal) for displaying an image in monochrome based on the above-mentioned color image signal. Hereafter, the image signal for displaying an image in monochrome is called a monochromatic image signal for convenience.

The image signal processing circuit 42 outputs a color image signal to the synchronous drive circuit 43 if it is determined that the visibility of color presentation is not deteriorated. The image signal processing circuit 42 outputs a monochromatic image signal to the synchronous drive circuit 43 if it is determined that the visibility of color presentation is deteriorated.

The synchronous drive circuit 43 acquires an image signal (a color image signal or a monochromatic image signal) from the image signal processing circuit 42, and synchronously drives the panel drive circuit 44 and the light source drive circuit 45. Specifically, it synchronizes for every display cell the drive of electrodes regulated by the panel drive circuit 44 and incidence of light from the light source 30 regulated by the light source drive circuit 45.

Although omitted in FIG. 7, the synchronous drive circuit 43 includes, as its functional structure, a timing generator, a display cell drive signal generator and a light source drive signal generator.

The timing generator generates a synchronizing signal for synchronizing a timing to which the panel drive circuit 44 operates and a timing to which the light source drive circuit 45 operates. The synchronizing signal generated by the timing generator is supplied to the panel drive circuit 44 and the light source drive circuit 45.

The display cell drive signal generator generates a display cell drive signal, which drives the electrodes assigned to a display cell, based on the image signal output from the image signal processing circuit 42, and supplies to the panel drive circuit 44 the display cell drive signal along with the synchronizing signal. The display cell drive signal includes a drive value (voltage value) assigned thereto, which correspond to a red, green or a blue component according an image signal.

The light source drive signal generator generates a light source drive signal which drives a red light source 33, a green light source 33, and a blue light source 33, which correspond to the respective display cells based on the image signal output from the image signal processing circuit 42, and supplies the light source drive signal to the light source drive circuit 45.

The panel drive circuit 44 and the light source drive circuit 45 are driven in synchronization with each other in accordance with the synchronizing signal output from the synchronous drive circuit 43 (timing generator). Specifically, in synchronization with lighting of the red light source 33 executed by the light source drive circuit 45 which operates in accordance with the light source drive signal, the panel drive circuit 44 applies between the electrodes of a display cell a voltage in proportion to the red component of the display cell which is the target of the display cell drive signal. Thereby, the red scattered light according to the voltage applied between the electrodes by the panel drive circuit 44 is emitted from the display cell which is a target of the display cell drive signal. A red color is discussed above, but the same applies to the remaining colors.

As the panel drive circuit 44 and the light source drive circuit 45 operate in synchronization with each other in this way, a red component, a green component, and a blue component of an image signal are reproduced in a respective display cell.

In order to appropriately reproduce every color component, the synchronous drive circuit 43 suitably determines the light-emission time and intensity (brightness) of the point light sources 33 (a red light source, a green light source, and a blue light source), and the voltage application time and size to the electrodes based on the image signal.

Now, an exemplary procedure of the image signal processing circuit 42 illustrated in FIG. 7 will be explained with reference to the flow chart of FIG. 8.

The image signal processing circuit 42 of the present embodiment is installed, for instance, as an exclusive integrated circuit (an exclusive IC) which achieves the function of displaying an image not in color but in monochrome when the visibility of color presentation is deteriorated.

An image signal (a color image signal) is input into the display device 10 in accordance with a predetermined frame rate. Let us assume here that the process illustrated in FIG. 8 is executed each time an image signal is input into the display device 10. It should be noted that an image signal is input into the display device 10 from the host device connected through a flexible distribution board etc. to the drive circuit 40. It is possible however that an image signal may be input from any external device other than the host device. An image which is displayed based on an image signal input into the display device 10 is hereafter called an object image.

First, the image signal processing circuit 42 acquires an image signal input into the display device 10 as described above (Step S1). This image signal is a color image signal for displaying the above-mentioned object image in color, and includes a red component, a green component, and a blue component (namely, signal values assigned to RGB components).

Subsequently, the image signal processing circuit 42 acquires an illuminance (value) measured by the illuminance sensor 41 (Step S2).

Figure 9:
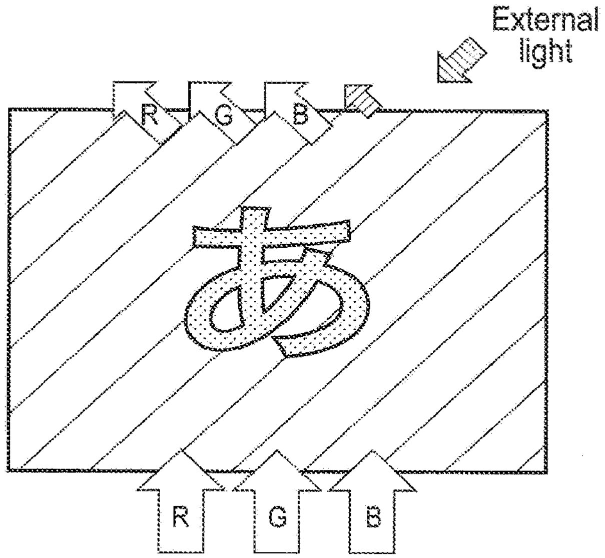
FIG. 9 is a diagram illustrating how an object image displayed in color is viewed in an environment where no external light is irradiated thereon.

Now, let us assume a case where an object image is displayed in color in an environment in which the display device 10 (the display panel 20) is very poorly irradiated with external light as illustrated in FIG. 9 (for instance, indoors) (namely, an object image is displayed in color). In this case, a user who uses the display device 10 can clearly view the object image displayed in color (what is displayed here in color is a Japanese character "あ").

Figure 10:
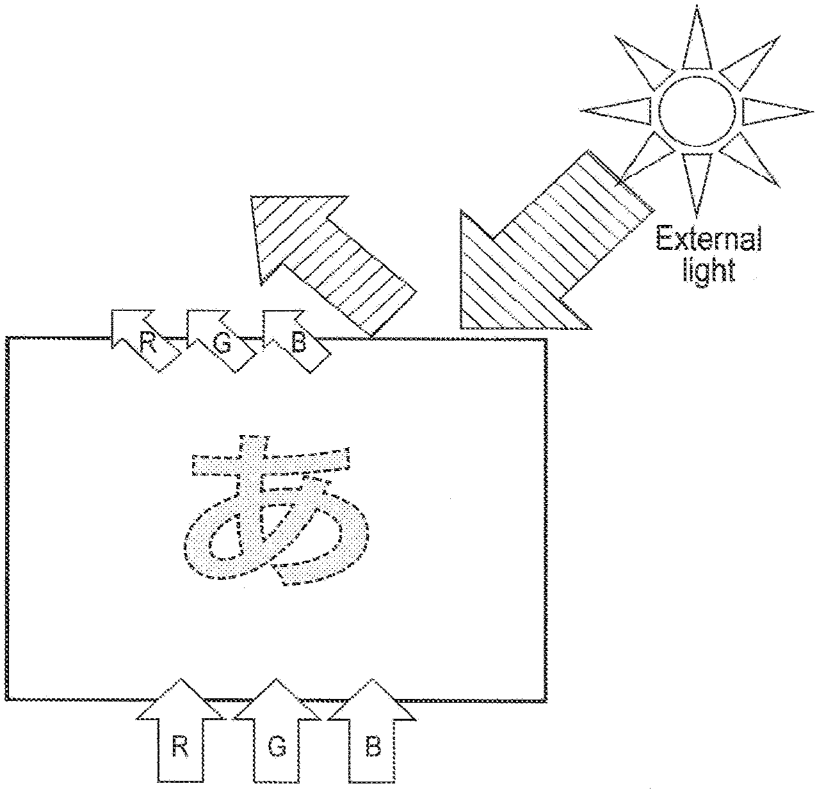
FIG. 10 is a diagram illustrating how an object image displayed in color is viewed in an environment where external light is irradiated thereon.

Subsequently, let us assume a case where an object image is displayed in color in an environment in which the display device 10 (the display panel 20) is fully irradiated with external light as illustrated in FIG. 10. In this case, the display device 10 employs a field sequential drive in order to make a color presentation, but the external light which is much brighter than the light from the light source 30 is output from the light-modulating layer 24 as scattered light. Therefore, the user cannot visually confirm the object image displayed in color (a character displayed in color).

Therefore, the image signal processing circuit 42 (the determination module 42*a*) determines whether or not the illuminance acquired in Step S2 is over a first threshold (Step S3) in order to determine whether the visibility of color presentation in the display device 10 is deteriorated because of the external light.

It should be noted that a value (illuminance) indicative of such a degree of brightness by which an image displayed in color cannot be visually confirmed is established as the first threshold. For example, the first threshold is held in advance in the image signal processing circuit 42. This makes it possible to determine that the visibility of color presentation is deteriorated because of external light if it is determined that illuminance is over the first threshold in Step S3. On the other hand, it is determined that the visibility of color presentation is not deteriorated even in the external light if it is determined that illuminance is not over the first threshold in Step S3.

If it is determined that illuminance is over the first threshold in Step S3 (YES of Step S3), the image signal processing circuit 42 (generation module 42*b*) generates based on the color image signal acquired in Step S1 an image signal for displaying the object image in monochrome (accordingly, the object image is displayed as a monochromatic image) (Step S4).

It should be noted that an image signal generated in Step S4 includes an image signal for displaying the object image as a gray scale image expressed by a white and black shade (hereinafter referred to as a gray scale image signal).

Specifically, the image signal processing circuit 42 executes a process of converting (the signal values of) the RGB components included in the color image signal into brightness (luminosity) Y, and two color differences Cr and Cb (henceforth, a YCrCb conversion process). The image signal processing circuit 42 extracts a signal indicative of the brightness Y of the object image through the YCrCb conversion process (hereinafter referred to as a brightness signal), and generates a gray scale image signal (a monochromatic image signal) based on the extracted brightness signal.

Figure 11:
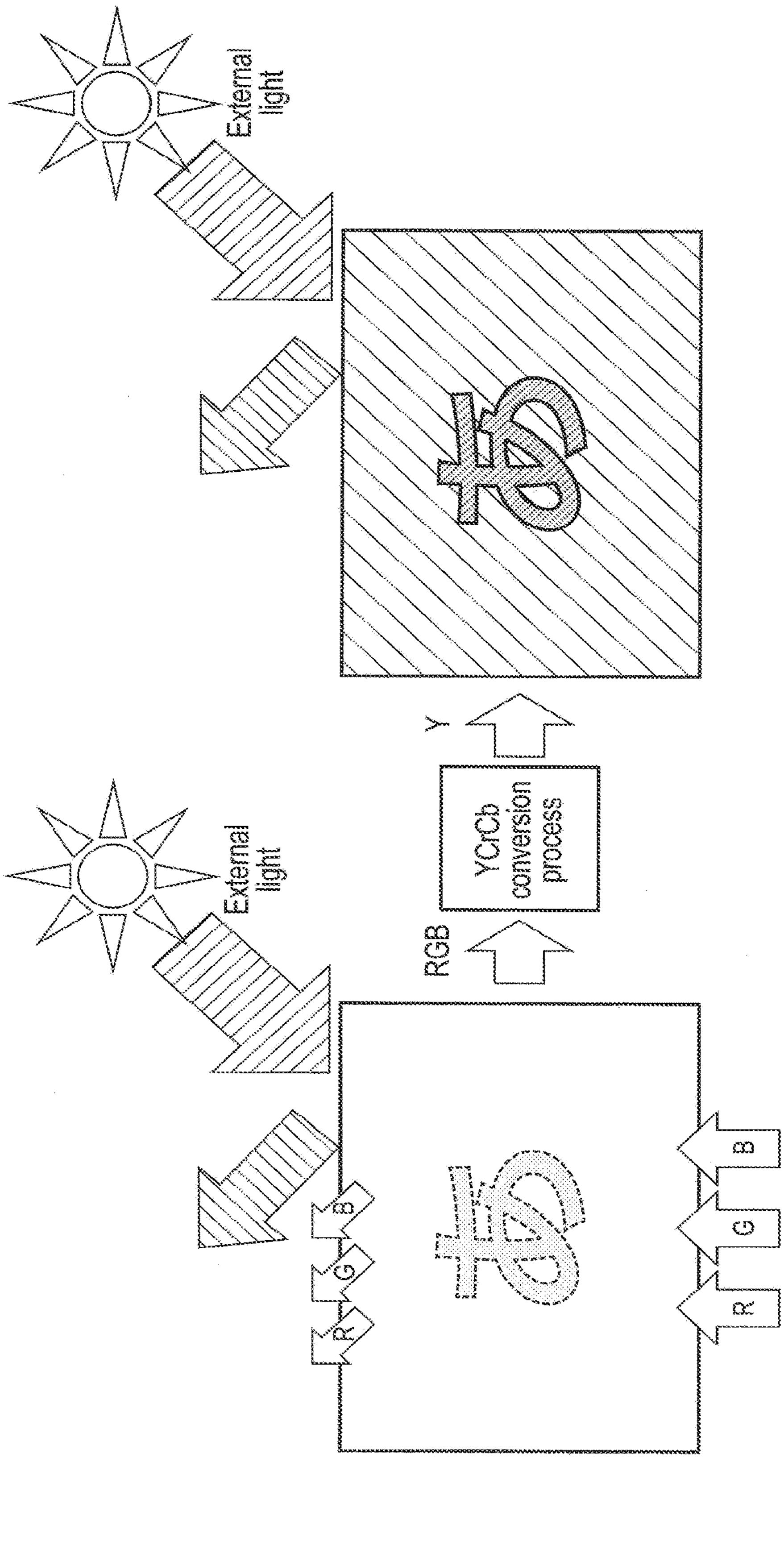
FIG. 11 is a diagram illustrating a case where an object image is displayed as a gray scale image.

If an object image (a gray scale image) is displayed based on such a gray scale image signal, the visibility of the object image will be improved in comparison with FIG. 10 mentioned above even in an environment where the object image is irradiated with external light, as illustrated in FIG. 11.

Even if an object image is displayed as a gray scale image, the object image (a character etc.) may not be visually confirmed in an environment where external light is still stronger.

Therefore, the image signal processing circuit 42 (the determination module 42*a*) determines whether or not the illuminance acquired in Step S2 is over a second threshold (Step S5) in order to further determine whether or not the visibility of the gray scale image in on the display device 10 is deteriorated because of external light.

It should be noted that the second threshold is a value (illuminance) which is larger than the first threshold mentioned above and which indicates such a degree of brightness of the external light by which an object image cannot be visually confirmed even if the object image is displayed as a gray scale image. For example, the second threshold is held in advance in the image signal processing circuit 42 similarly to the first threshold mentioned above.

If it is determined that the illuminance is over the second threshold in Step S5 (YES of Step S5), the image signal processing circuit 42 executes binarization processing based on (the brightness signal in) the gray scale image signal generated in Step S4. It is the binarization processing that converts the gray scale image signal generated in Step S4 into such an image signal (a second image signal) that makes those pixels that are brighter than a predetermined value to be displayed in white, whereas those pixels that are less brighter than the predetermined value to be displayed in black. Thereby, the image signal processing circuit 42 (the generation module 42*b*) generates an image signal for displaying an object image as a binary image which is presented in white and black (hereinafter referred to as a binary image signal) (Step S6).

Figure 12:
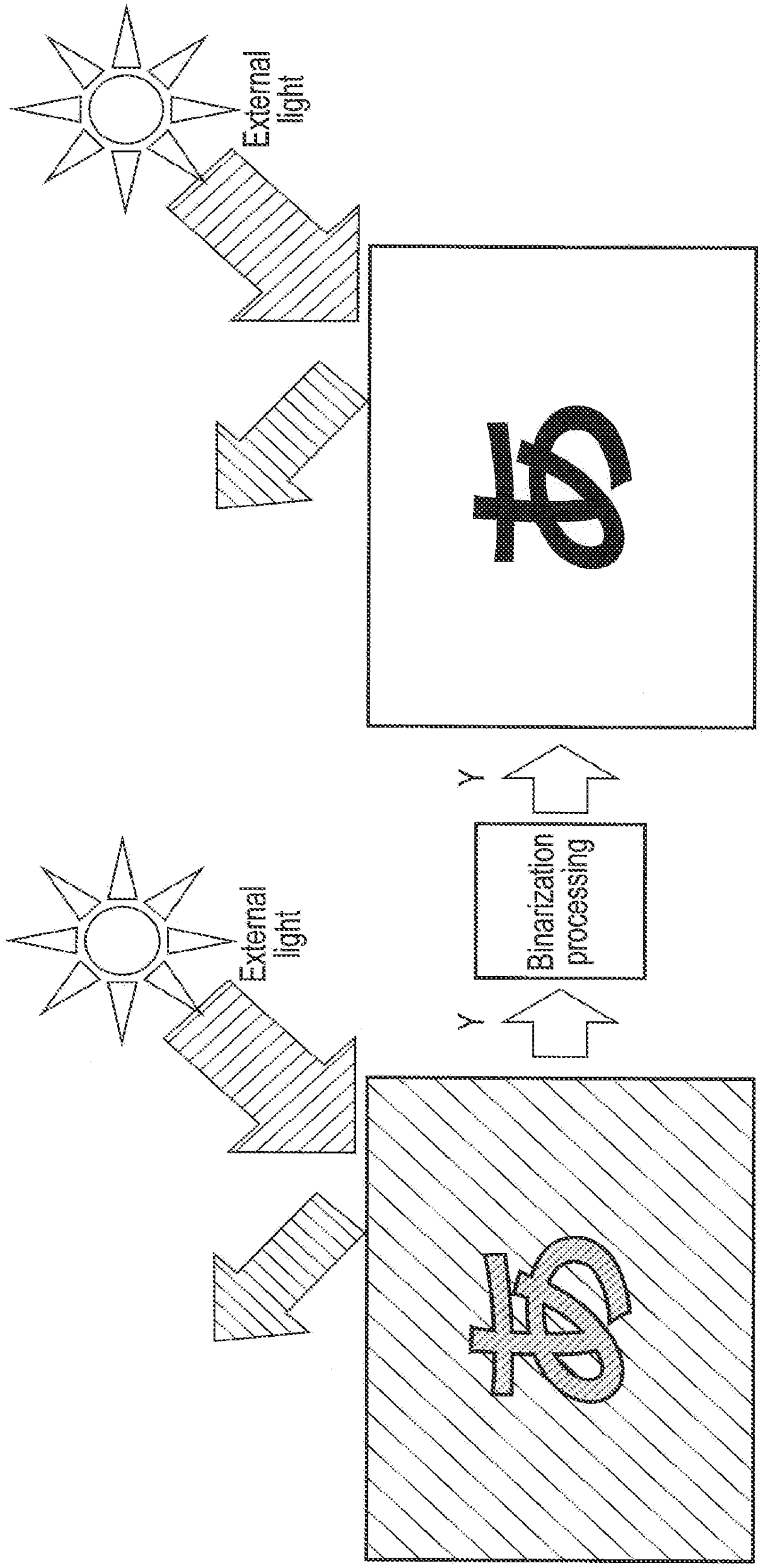
FIG. 12 is a diagram illustrating a case where an object image is displayed as a binary image.

An object image (a binary image) which is displayed based on such a binary image signal can further improve in visibility as illustrated in FIG. 12 in comparison with the above-mentioned gray scale image illustrated in FIG. 11.

If it is determined that the illuminance is not over the first threshold in Step S3 (No of Step S3), the color image signal acquired in Step S1 is output to the synchronous drive circuit 43. In this case, the synchronous drive circuit 43, the panel drive circuit 44, and the light source drive circuit 45 operate to display the object image as a color image.

Moreover, if it is determined that the illuminance is not over the second threshold in Step S5 (NO of Step S5), the gray scale image signal generated in Step S4 is output to the synchronous drive circuit 43. In this case, the synchronous drive circuit 43, the panel drive circuit 44, and the light source drive circuit 45 operate to display the object image as a gray scale image.

Moreover, if Step S6 is executed, the binary image signal generated in Step S6 is output to the synchronous drive circuit 43. In this case, the synchronous drive circuit 43, the panel drive circuit 44, and the light source drive circuit 45 operate as described above to display the object image as a binary image.

Figure 8:
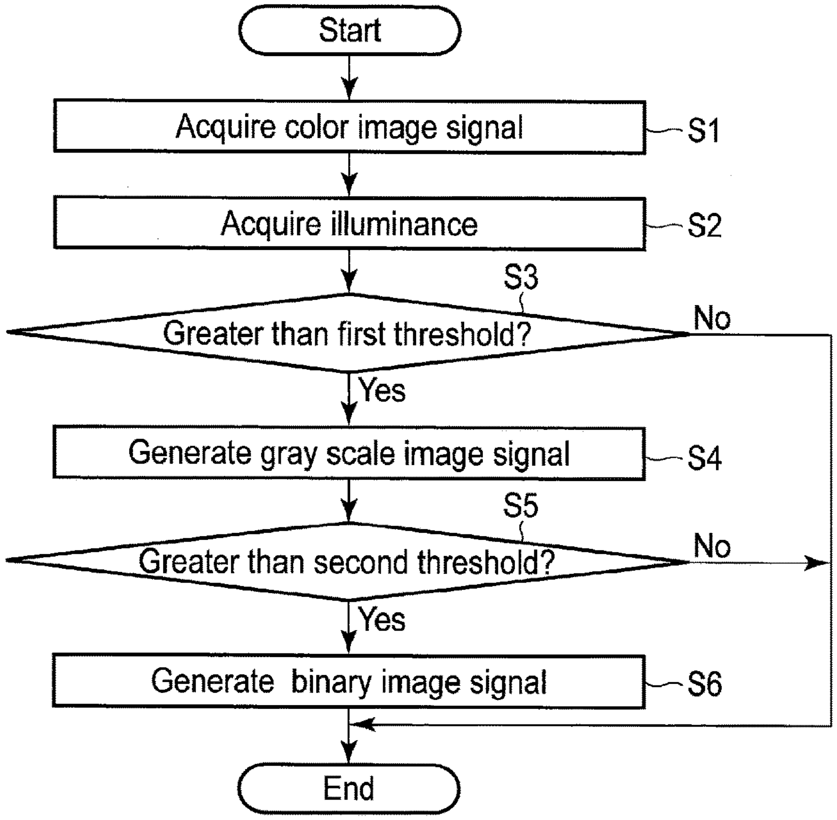
FIG. 8 is a flow chart illustrating an exemplary procedure of an image signal processing circuit.

The process illustrated in FIG. 8 is explained above that an object image is displayed as a gray scale image when illuminance is over the first threshold whereas an object image is displayed as a binary image when illuminance is over the second threshold. However, it is possible to omit both Step S4 and Step S5. In this case, if illuminance is over the first threshold, an object image is displayed as a binary image. Moreover, it is possible to omit Steps S5 and S6 in the process illustrated in FIG. 8.

As has been described above, in the present embodiment, if it is determined that the visibility of color presentation is deteriorated because of external light, a luminance signal indicative of the brightness of an object image is extracted from a color image signal (a first image signal) for displaying the object image in color, a monochromatic image signal (a second image signal) for displaying the object image in monochrome is generated based on the extracted luminance signal, and the object image is displayed in monochrome based on the monochromatic image signal.

The present embodiment makes it possible to secure visibility even in an environment where external light is applied, because a monochromatic image which is easy to be visually confirmed is displayed when the display device 10 is used in the environment where external light is irradiated on (the display surface of) the display panel 20.

A monochromatic image signal generated in the present embodiment includes a gray scale image signal for displaying an object image as a gray scale image and a binary image signal for displaying an object image as a binary image. Specifically, if the illuminance measured by the illuminance sensor 41 is larger than a first threshold (a predetermined first value), a gray scale image signal is generated. Furthermore, if the illuminance measured by the illuminance sensor 41 is larger than a second threshold (a second value larger than the first value), a binary image signal is generated.

The present embodiment has the above-mentioned structure, so that it is possible for the present embodiment to secure visibility even when external light is irradiated. Specifically, when external light has such illuminance (brightness) that may deteriorate the visibility of color presentation, a gray scale image is displayed, whereby visibility can be secured. If the illuminance becomes still higher and even the gray scale image cannot secure visibility, then a binary image is displayed, whereby visibility can be secured.

The display device 10 of the present embodiment includes a liquid crystal display device which uses polymer dispersed liquid crystals (PDLC's) and which displays an image by selectively scattering lights entered the light-modulating layer 24. The display device 10 does not require color filters, polarizing plates, etc., and has high transmittance. Therefore, it is assumed that the display device 10 is installed in a car in such a manner that a front visual field is secured and (various images including) characters indicative of the present speed of the car or an arrow indicative of a traveling direction is displayed.

When such a use is assumed, it may not be necessary for the user to visually confirm an entire color image displayed on (the display panel 20 of) the display device 10 but it may suffice the user in many cases to visually confirm only a character or an arrow included in the image.

Therefore, in the present embodiment, if the visibility of color presentation is deteriorated because of external light, an object image is displayed in monochrome so that at least a character or an arrow may be visually confirmed. The present embodiment makes it possible to utilize the display device 10 even under an environment where external light is irradiated. It should be noted that all that is required for the present embodiment is that an object image should be displayed in such a manner that at least a character or an arrow or the like can be visually confirmed even under the environment where external light is irradiated. Therefore, an image may be displayed in such a manner that a character or an arrow is indicated in black and the remaining regions (display cells) are transparent.

Moreover, if the display device 10 is used in an environment where external light is irradiated as described above (i.e., if an object image is displayed as a gray scale image or a binary image), the object image is displayed by the external light entering the light-modulating layer 24, scattering in the light-modulating layer 24, and emitted from the light-modulating layer 24. Accordingly, this case does not require any light from the light source 30 in order to display an object image. Therefore, it is possible for the present embodiment that the light source drive circuit 45 stops radiation of the light source 30 (the light source drive circuit 45 will make the light source 30 switch off), if an object image is displayed in monochrome (if an object image is displayed as a gray scale image or a binary image). The present embodiment makes it possible to promote power-saving during the period of displaying an object image using external light.

It has been explained that a monochromatic image signal (a gray scale image signal and a binary image signal) is generated based on the illuminance measured by the illuminance sensor 41. However, in some cases, even though the illuminance measured by the illuminance sensor 41 is over the first threshold, the user can visually confirm color presentation depending on the spatial relationship between the user and the display device 10. Similarly, in other cases, even though the illuminance measured by the illuminance sensor 41 is not over the first threshold, it is difficult for the user to visually confirm color presentation because of the spatial relationship between the user and the display device 10.

Therefore, it is possible to modify the present embodiment in such a manner that a monochromatic image signal is generated in accordance with instructions (operations) of the user who uses the display device 10 (i.e., a displayed object image is switched between color presentation and monochromatic presentation). Such modification improves a user's convenience, because such modification surly avoids an occurrence of a situation in which an object image will be displayed as a monochromatic image even though a color presentation can be visually confirmed, or a color presentation will be continued even though the visibility of the color presentation is already deteriorated. Moreover, it is also possible to make a monochromatic image signal to be generated only during a predetermined time period, for example.

A liquid crystal display device using polymer dispersed liquid crystals has been mainly explained as an example of the display device 10. However, the present embodiment may be applied to any display devices other than the liquid crystal display device using macromolecule distributed liquid crystals.

Figure 13:
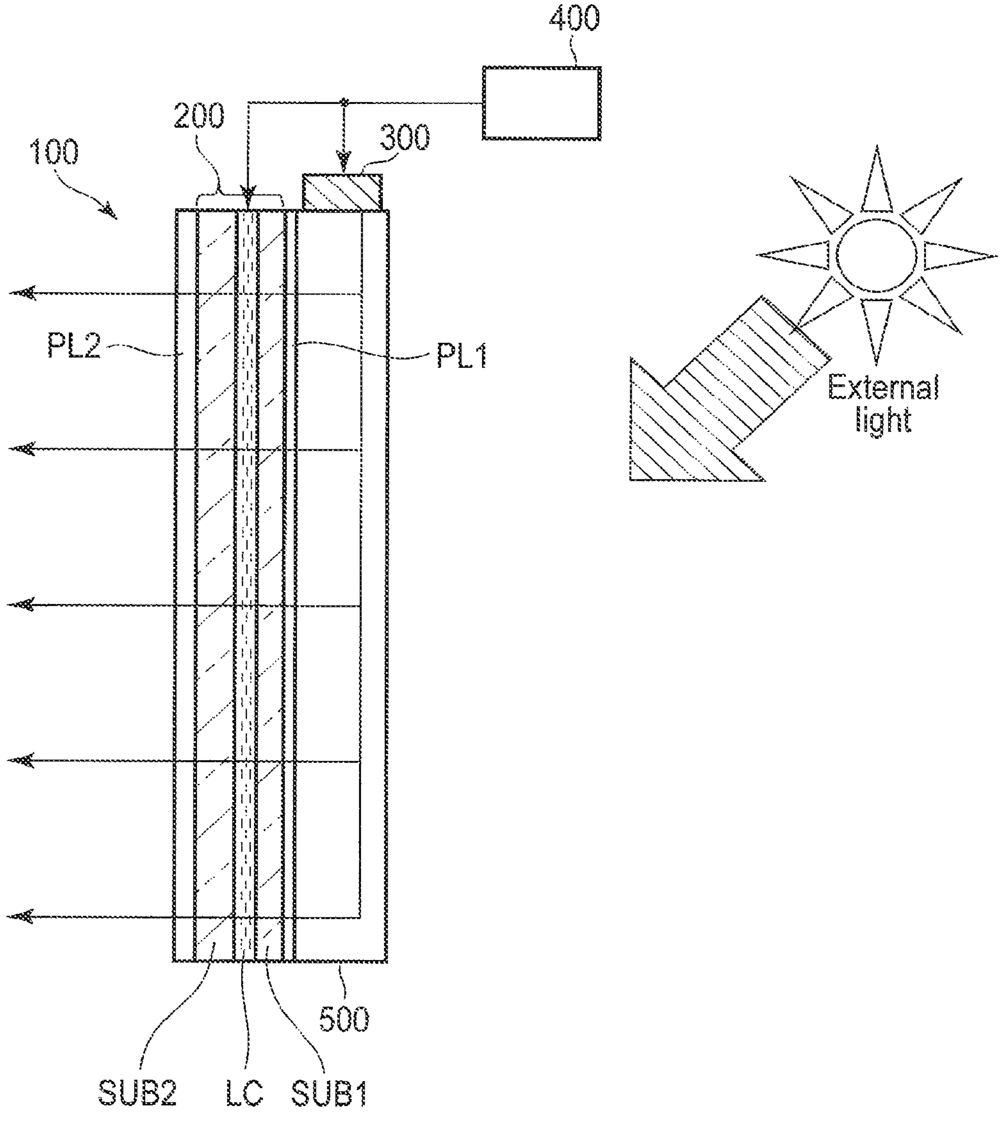
FIG. 13 is a diagram schematically illustrating an exemplary structure of a display device according to a modification of the embodiment.

Now, a modified embodiment will be explained with reference to FIG. 13. FIG. 13 is a diagram schematically illustrating an exemplary structure of a display device in the modified embodiment.

A display device 100 illustrated in FIG. 13 includes a display panel 200, a light source 300, a drive circuit 400 which drives the display panel 200 and the light source 300, and a light guide plate 500.

The display panel 200 includes a first substrate SUB1, a second substrate SUB2 opposite to the first substrate SUB1, a liquid crystal layer LC located between the first substrate SUB1 and the second substrate SUB2, a first polarizer PL1, and a second polarizer PL2. In the present modification, the first substrate SUB1 and the second substrate SUB2 are respectively constituted as in the case of the first substrate SUB1 and the second substrate SUB2, explained with reference to FIG. 2. Therefore, the first substrate SUB1 and the second substrate SUB2 will not be explained in full detail. The first polarizer PL1 is provided in an external surface of the first substrate SUB1 and the second polarizer PL2 is provided in an external surface of the second substrate SUB2.

The light guide plate 500 is transparent, and is adjacent to one side surface of the display panel 200 and extends over the display panel 200. In the illustrated example, the light guide plate 500 extends over the first polarizing plate PL1. It should be noted that, if the light emitted from a light source is linearly polarized light, the first polarizer PL1 may be omitted.

The light source 300 includes LED's etc., for example, and is provided on a side surface of the light guide plate 500. The light from the light source 300 passes through the light guide plate 500 and the liquid crystal layer LC of the display panel 200, and is finally emitted from a front (a display surface) of the display panel 200.

The drive circuit 400 drives the light source 300 based on the image signal input from the above-mentioned host device or the like. The drive circuit 400 drives the display panel 200 based on the image signal of a corresponding color according to the lighting period of the light source 300. The display panel 200 selectively allows the light entering the liquid crystal layer LC to pass through, thereby displaying an image. It should be noted that the display device 100 which belongs to the modified embodiment and displays a color image based on an image signal is driven by a field sequential drive (system) as in the embodiment mentioned above.

Now, let us assume here that external light is irradiated on a back surface of the display device 100 (the display panel 200). Then, the external light which is much brighter than the light from the light source 300 will pass through the liquid crystal layer in addition to the light from the light source 300. When the display device 100 is used in the environment where external light is irradiated, it is difficult to recognize the light from the light source 300 (namely, a color presentation) because of the influence of the external light.

Therefore, the modification also makes it possible, if the display device 100 is used in an environment where external light is irradiated, to generate a monochromatic image signal (a gray scale image signal or a binary image signal) and to display an image as a monochromatic image. Therefore, the present modification also makes it possible, as in the aforementioned embodiment, to secure visibility even in the environment where external light is irradiated.

As has been described above, the present embodiment, including the above modification, may be applicable to any liquid crystal display device which is high in transmittance, and achieves color presentation by a field sequential drive without having any color filters.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Now, an invention related to the above embodiment and the above modification is added below.

[C1]

A display device including a plurality of light sources emitting light of different colors, a display panel illuminated by the light sources; and a driver which drives the light sources time-divisionally to emit light sequentially based on a first image signal for displaying an image in color on the display panel;

the display device including:

a determination module which determines whether visibility of the image displayed in color deteriorates because of external light, and a generation module which extracts from the first image signal a brightness signal indicative of brightness of the image when it is determined that the visibility of the image deteriorates and generates a second image signal based on the brightness signal, wherein the driver drives the display panel based on the second image signal when the second image signal is generated.

[C2]

The display device of [C1], further including an illuminance sensor which measures an illuminance by external light, wherein the driver determines that the visibility of the image displayed in color deteriorates when the illuminance measured by the illuminance sensor is larger than a predetermined value.

[C3]

The display device of [C2], wherein the generation module generates the second image signal for displaying the image as a gray scale image expressed by a white and black shade when the illuminance measured by the illuminance sensor is larger than a predetermined first value, and generates the second image signal for displaying the image as a binary image expressed by white and black when the illuminance measured by the illuminance sensor is larger than a second value larger than the first value.

[C4]

The display device of [C1], wherein the driver stops the light sources to emit light when the image is displayed in monochrome.

[C5]

The display device of [C1], wherein the display panel includes:

a pair of transparent boards;

a light-modulating layer including polymer dispersed liquid crystals held between the pair of transparent boards; and a first electrode and a second electrode to apply voltage to the light-modulating layer, and the light sources are on a side surface of the display panel.

[C6]

The display device of [C1], wherein the display panel includes:

a pair of transparent boards;

a liquid crystal layer held between the pair of transparent boards;

a first electrode and a second electrode to apply voltage to the liquid crystal layer; and a light guide plate being transparent and extending over a back surface of the liquid crystal layer, and the light sources are on a side surface of the light guide plate.

[C7]

A display method executed by a display device including light sources emitting light of different colors, a display panel illuminated by the light sources, and a driver driving the light sources time-divisionally to emit light sequentially based on a first image signal for displaying an image in color on the display panel, the display method including:

a step of determining whether the visibility of the image displayed in color deteriorates because of external light;

a step of extracting from the first image signal a brightness signal indicative of brightness of the image when it is determined that visibility of the image deteriorates, and generating a second image signal based on the brightness signal, and a step of driving the display panel based on the second image signal when the second image signal is generated.

[C8]

The display method of [C7], wherein the display device further includes an illuminance sensor which measures an illuminance by the external light, and the determining step includes a step of determining that the visibility of the image displayed in color deteriorates when the illuminance measured by the illuminance sensor is larger than a predetermined value.

[C9]

The display method of [C8], wherein the generating step includes:

a step of generating a second image signal for displaying the image as a gray scale image expressed by a white and black shade when the illuminance measured by the illuminance sensor is larger than a predetermined first value; and a step of generating a second image signal for displaying an image as a binary image expressed by white and black when the illuminance measured by the illuminance sensor is larger than a second value larger than the first value.

[C10]

The display method of [C7], further including a step of stopping the light sources to emit light when the image is displayed in monochrome.

[C11]

The display method of [C7], wherein the display panel includes:

a pair of transparent boards;

a light-modulating layer including polymer dispersed liquid crystals held between the pair of transparent boards, and a first electrode and a second electrode to apply voltage to the light-modulating layer, and the light sources are on a side surface of the display panel.

[C12]

The display method of [C7], wherein the display panel includes:

a pair of transparent boards;

a liquid crystal layer held between the pair of transparent boards;

a first electrode and a second electrode to apply voltage to the liquid crystal layer; and a light guide plate being transparent and extending over a back surface of the liquid crystal layer, and the light sources are on a side surface of the light guide plate.

What is claimed is:

1. A display device comprising:

a plurality of light sources emitting of light of different colors;

a display panel illuminated by the light sources;

a drive circuit configured to drive the light sources time-divisionally to emit light sequentially based on a first image signal for displaying an image in color on the display panel; and an illuminance sensor which measures an illuminance by external light;

wherein the drive circuit is configured to:

determine whether visibility of the image displayed in color deteriorates when the illuminance measured by the illuminance sensor is larger than a predetermined value, extract from the first image signal a brightness signal indicative of brightness of the image when determining that the visibility of the image deteriorates, generate a second image signal, based on the brightness signal, for displaying the image as a gray scale image expressed by a white and black shade when the illuminance measured by the illuminance sensor is larger than a predetermined first value, generate a second image signal, based on the brightness signal, for displaying the image as a binary image expressed by white and black when the illuminance measured by the illuminance sensor is larger than a second value larger than the first value, and drive the display panel based on the second image signal when the second image signal is generated.

2. The display device of claim 1, wherein the display panel comprises:

a pair of transparent boards;

a light-modulating layer comprising polymer dispersed liquid crystals held between the pair of transparent boards; and a first electrode and a second electrode to apply voltage to the light-modulating layer, and the light sources are on a side surface of the display panel.

3. The display device of claim 1, wherein the display panel comprises:

a pair of transparent boards;

a liquid crystal layer held between the pair of transparent boards;

a first electrode and a second electrode to apply voltage to the liquid crystal layer; and a light guide plate being transparent and extending over a back surface of the liquid crystal layer, and the light sources are on a side surface of the light guide plate.

4. The display device of claim 1, wherein the drive circuit is configured to generate the second image signal in accordance with instructions from a user.

5. The display device of claim 4, wherein the second image signal is generated when it is determined that the visibility of the image does not deteriorate and when the instructions to generate the second image signal from the user are received.

6. The display device of claim 1, wherein the drive circuit is configured to generate the second image signal during a predetermined time period.

7. A display method executed by a display device comprising light sources emitting light of different colors, a display panel illuminated by the light sources, a drive circuit driving the light sources time-divisionally to emit light sequentially based on a first image signal for displaying an image in color on the display panel, and an illuminance sensor measuring an illuminance by the external light, the display method comprising:

determining whether visibility of the image displayed in color deteriorates because of external light;

extracting from the first image signal a brightness signal indicative of brightness of the image when determining that the visibility of the image deteriorates, generating a second image signal based on the brightness signal, and driving the display panel based on the second image signal when the second image signal is generated, wherein the determining comprises determining that the visibility of the image displayed in color deteriorates when the illuminance measured by the illuminance sensor is larger than a predetermined value, the generating comprises:

generating a second image signal for displaying the image as a gray scale image expressed by a white and black shade when the illuminance measured by the illuminance sensor is larger than a predetermined first value; and generating a second image signal for displaying an image as a binary image expressed by white and black when the illuminance measured by the illuminance sensor is larger than a second value larger than the first value.

8. The display method of claim 7, further comprising:

stopping the light sources to emit light when the display panel is driven based on the second image signal.

9. The display method of claim 7, wherein the display panel comprises:

a pair of transparent boards;

a light-modulating layer comprising polymer dispersed liquid crystals held between the pair of transparent boards, and a first electrode and a second electrode to apply voltage to the light-modulating layer, and the light sources are on a side surface of the display panel.

10. The display method of claim 7, wherein the display panel comprises:

a pair of transparent boards;

a liquid crystal layer being held between the pair of transparent boards;

a first electrode and a second electrode to apply voltage to the liquid crystal layer; and a light guide plate being transparent and extending over a back surface of the liquid crystal layer, and the light sources are on a side surface of the light guide plate.

11. The display method of claim 7, wherein the generating comprises generating the second image signal in accordance with instructions from a user.

12. The display device of claim 11, wherein the second image signal is generated when it is determined that the visibility of the image does not deteriorate and when the instructions to generate the second image signal from the user are received.

13. The display method of claim 7, wherein the generating comprises generating the second image signal during a predetermined time period.

14. A display device comprising:

a plurality of light sources emitting of light of different colors;

a display panel illuminated by the light sources; and a drive circuit configured to drive the light sources time-divisionally to emit light sequentially based on a first image signal for displaying an image in color on the display panel;

wherein the drive circuit is configured to:

determine whether visibility of the image displayed in color deteriorates because of external light, extract from the first image signal a brightness signal indicative of brightness of the image when determining that the visibility of the image deteriorates, generate a second image signal based on the brightness signal, and drive the display panel based on the second image signal when the second image signal is generated, wherein the drive circuit is configured to stop the light sources to emit light when the display panel is driven based on the second image signal.

15. The display device of claim 14, wherein the display panel comprises:

a pair of transparent boards;

a light-modulating layer comprising polymer dispersed liquid crystals held between the pair of transparent boards; and a first electrode and a second electrode to apply voltage to the light-modulating layer, and the light sources are on a side surface of the display panel.

16. The display device of claim 14, wherein the display panel comprises:

a pair of transparent boards;

a liquid crystal layer held between the pair of transparent boards;

a first electrode and a second electrode to apply voltage to the liquid crystal layer; and a light guide plate being transparent and extending over a back surface of the liquid crystal layer, and the light sources are on a side surface of the light guide plate.

17. The display device of claim 14, wherein the drive circuit is configured to generate the second image signal in accordance with instructions from a user.

18. The display device of claim 17, wherein the second image signal is generated when it is determined that the visibility of the image does not deteriorate and when the instructions to generate the second image signal from the user are received.

19. The display device of claim 14, wherein the drive circuit is configured to generate the second image signal during a predetermined time period.

* * * * *